July 7, 1931. H. SWANSON 1,812,997
CHECK MARKING DEVICE
Filed Dec. 13, 1929 2 Sheets-Sheet 2
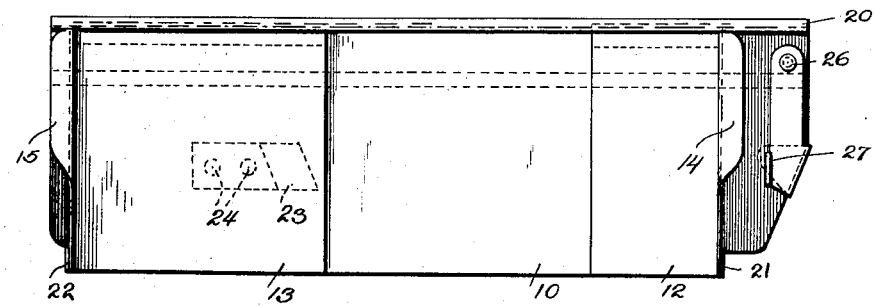
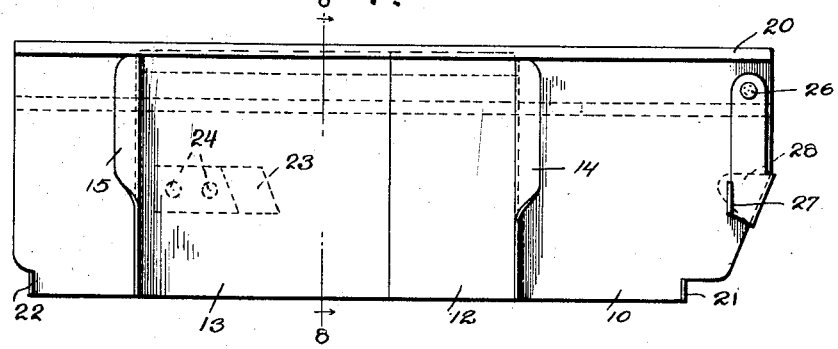
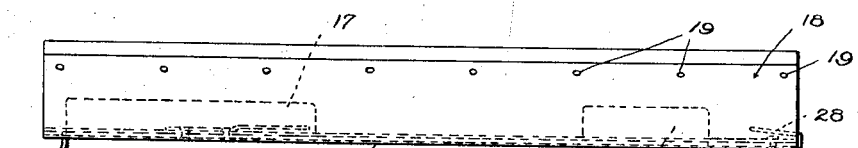
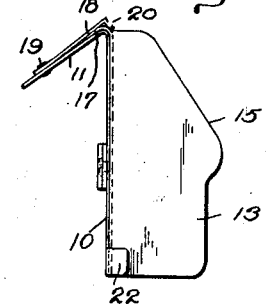
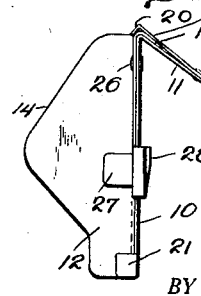
INVENTOR.
Hjalmar Swanson
Henry Love Clarke
BY ATTORNEY.

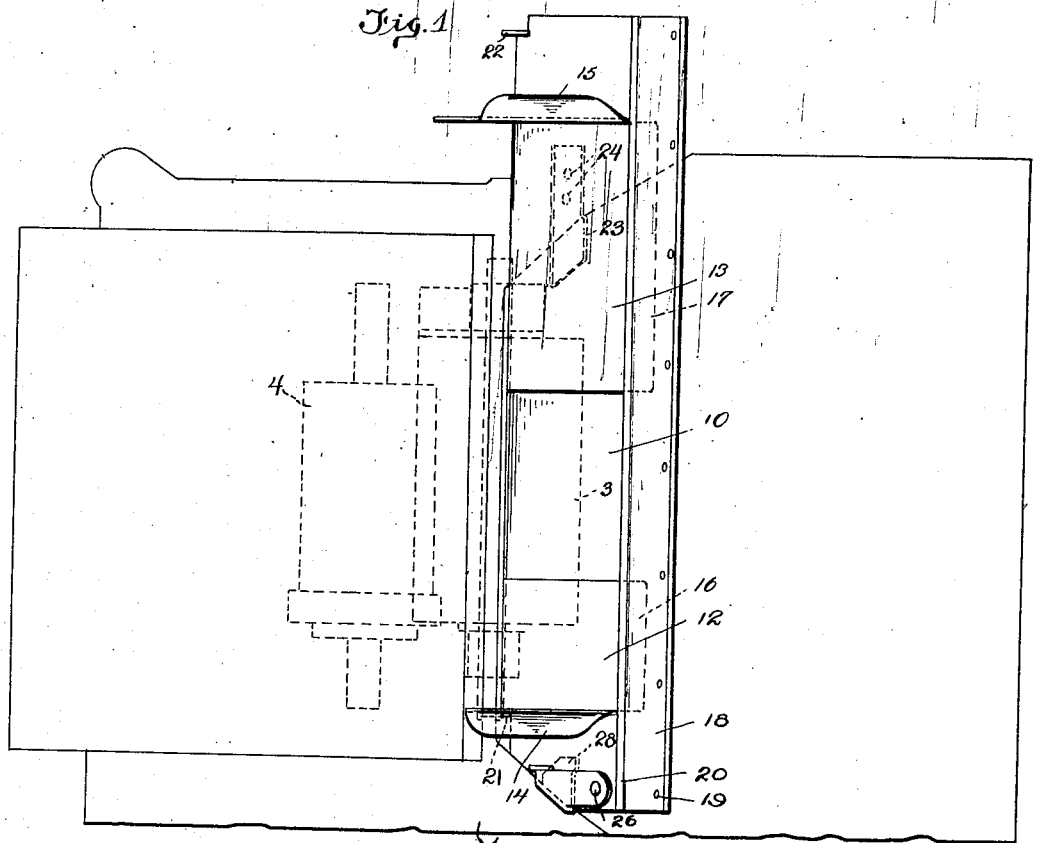

Patented July 7, 1931

1,812,997

UNITED STATES PATENT OFFICE

HJALMAR SWANSON, OF CHICAGO, ILLINOIS, ASSIGNOR TO CUMMINS PERFORATOR COMPANY, OF CHICAGO, ILLINOIS, A CORPORATION OF ILLINOIS

CHECK MARKING DEVICE

Application filed December 13, 1929. Serial No. 413,817.

The invention relates to machines for endorsing, signing or otherwise marking checks, or similar slips of paper and has particular relation to a guide device which is adapted to be removably secured to the machine for the purpose of insuring the location of the signature or other printed indicia in a uniform and predetermined position on checks or other paper slips, whether the same are of uniform dimensions or in the event of checks or slips to be marked are of various sizes.

The operation of signing checks on their faces by means of a check endorser is of recent application and has been brought about by reason of the vast increase in the number of checks which at the present time are signed in batches or lots on account of most banks and business concerns having adopted the practice of paying payrolls by checks; also on account of the development and growth of savings clubs such as Christmas savings clubs, vacation clubs, etc., where a bank pays out a great many items for a similar purpose by check at the same time; also on account of dividend payments by check, which are very extensive, and for other reasons or causes where checks are issued in batches or a large number at a time. It has been common in the past to employ a check endorsing machine for the purpose of imprinting the bank endorsement on the reverse side of checks which pass through a particular bank or clearing house. In such instances it is immaterial whether the impression of the die is placed upon the check with particular regard to uniformity, i. e., whether the endorsement is substantially at right angles to the longitudinal dimension of the check or other slip. However, since the advent of the procedure of signing the face of checks by mechanical means it is necessary to insure that the signature is impressed on the line provided for the same so as not to mar or otherwise disfigure the completed check. When checks are fed to a machine successively and in large quantities it frequently happens that certain of the checks or slips are fed between the printing and impression rollers at an angle thereto or too far toward one side or the other, which has resulted in the signature being impressed more or less indiscriminately. The result is that certain checks are unsightly in appearance and their negotiability may be impaired. Other disadvantages obtain which heretofore have not presented themselves when checks are signed by hand.

A principal object of the present invention is to provide a guide device for check endorsing machines which will insure that all checks will be received between the printing and impression rollers uniformly and evenly so that the signature or other indicia will be impressed upon each check in like manner.

A further object is to provide a guide device of the character described which will prevent the checks from being tilted or canted as they are fed between the rolls and further which will insure each individual check being fed to the machine in the same longitudinal relation with respect to the printed indicia carried by the type carrying roller.

A further object of the invention is to provide a check guiding device which may be readily and conveniently secured to and removed from check endorsing machines of standard make and well known application without adjustment or alteration of other parts of the machine and without interfering with other uses for which the machine may be adapted.

A still further object resides in the provision of a check guiding device composed of few parts which may be economically manufactured and is capable of continuous usage without deterioration or wear.

A further object of the invention is to provide a line guide device for check endorser machines, when employed for dating checks, receipt stubs or other papers, adapted to guide the checks in alignment with the marking device. When a check endorsing machine is employed for dating and marking identification indicia on receipt stubs, the guide device of the present invention is of great utility because the stubs are too narrow to be guided and fed through the machine properly with the standard feeding arrangement provided for the larger sized checks but with the guide device of the present invention these stubs may be fed properly and in alignment with marking device therefor, irrespective of size.

A further object of the present invention is the provision of a check guide of the above noted type that is detachable from the machine and readily and easily adjustable to different sizes of checks when either on or off the machine.

In the accompanying drawings, forming a part of this specification, and showing for purposes of exemplification a preferred form and manner in which the invention may be embodied and practiced, but without limiting the claimed invention specifically to such illustrative instance or instances:

Fig. 1 is a plan view of a check endorsing machine showing a preferred embodiment of the check guiding device positioned thereon. The details of the machine form no part of the present invention and have been illustrated more or less diagrammatically but with sufficient clarity to show the relation of the same to the check guiding device.

Fig. 2 is a side elevation of the same.

Fig. 3 is a plan view of the guide device showing the adjustable slide members thereof in extended position.

Fig. 4 is a similar view showing the slide members in their innermost position.

Fig. 5 is a rear end elevation of the device.

Fig. 6 is a side elevation of the check guiding device looking from the upper side of Fig. 1.

Fig. 7 is a similar view looking from the lower side of Fig. 1.

Fig. 8 is a vertical transverse section through the check guiding device on line 8—8 of Fig. 4.

Referring to the drawings, 1 indicates generally a check endorsing machine which may be driven by hand, motor or other power. In some check endorser machines the impression roll is driven direct from the motor, while others have the die carrying roll driven direct from the motor with the impression roll as an idler. The guide device of the present invention if of useful application with either of these types of machines and also with other types. In the present embodiment the machine is of the power driven type and is operated by means of motor 2 contained in the machine and arranged through any suitable or preferred transmission gearing to impart rotary motion to the driving or impression roller 3 of the machine. As an example of a check endorser machine in conjunction with which the present invention is adapted to be used, reference is made to my issued Patent No. 1,617,874, for check endorser machine, issued Feb. 15, 1927.

The usual printing or type roller is shown at 4 and carries a removable plate or die bearing the signature or other printed indicia to be impressed upon the check when the latter passes between the impression roller 3 and type carrying or printing roller 4. The roller 3 is preferably continuously driven by the motor while the printing roller normally remains stationary but is actuated by a check to be thrown into driving engagement with the roller 3 for impressing the desired signature or other data on the check when the latter passes between the rolls. The mechanism for effecting the described intermittent rotation of the impression roller 4 forms no part of the present invention and is fully set forth and described in my said prior patent.

A feed roller 4a is driven by the drive roller 3. A check passing between said rolls is brought into contact with the impression roll actuating mechanism for imparting rotation to the printing roller 4.

The adjustable check guide is shown at 5 and is removably mounted in any preferred manner on the frame of the machine adjacent the point of delivery of the check between the described rolls 3 and 4, to receive the signature to be impressed on the check. As illustrated the top of the machine is provided at one end with a dust proof and protective cover plate 6 terminating in a cutaway and down-turned portion 7. The other end of the machine is similarly provided with a cover plate 8 terminating in a down-turned portion 9. The check guide 5 is designed to be positioned on the machine between the cover plates 6 and 8 and in the illustrated embodiment is removably secured to the downturned portion or flange 7 of the rear cover plate 6.

The check guide member consists of a rectangular base plate or body portion 10 terminating in a preferably integral downwardly turned and angularly disposed portion 11. The adjustable portions of the check guide consist of two plate members 12 and 13, preferably of sheet metal, which plate members conform to and lie closely against the body member or plate 10 of the guide. The movable members 12 and 13 are provided each with an upturned preferably integral wing or guide flange 14 and 15 respectively, and are further provided each with downturned and preferably integral extensions 16 and 17 conforming to and lying closely against the downturned portion 11 of the base plate or member 10. The top portions of the lateral guide flanges 14 and 15 are preferably flared outwardly as illustrated in order to facilitate the insertion of checks or other slips which fit closely therebetween. A guide or confining strip 18 extends substantially for the length of the portion 11 of the base plate and is suitably secured thereto as by rivets 19. The free end of the guide strip 18 is inwardly turned at 20 to overlie and yieldably contact with the downturned marginal portions 16 and 17 of the adjustable guide members 12 and 13. A guide channel is thus formed between the portion 11 of the base plate and the guide strip 18 to permit transverse movement of the guide members 12 and 13 or movement of the latter axially with respect to the longitudinal dimension of the base plate 10 of the check guide. Contact members 21 and 22 are provided, preferably in the form of integral lugs struck up from the base plate 10 to limit the outward sliding movement of the adjustable members 12 and 13 respectively. The upstanding guide flanges 14 and 15 further provide a convenient means for manual adjustment of the plates 12 and 13 relative to the base plate 10 and the printing roller.

For the purpose of conveniently and rapidly positioning the check guide on the machine, the base plate 10 of the former is provided on its under side adjacent one end with an offset projection or hook 23 suitably riveted or otherwise secured as at 24 to the base plate and designed to engage one edge of the downturned and cut away portion 7 of the cover plate 6 as will be best seen in Fig. 1. The opposite end of the base plate 10 is provided with a locking lever 25 pivotally mounted as at 26 to the plate 10. The free end of the pivoted lever is provided with an operating knob or handle 27 and is bent inwardly upon itself to form a hook shaped portion 25ª which may be swung into and out of engagement with the opposite side of the downturned portion 7 of the cover plate 6.

The check guide unit is removably secured to the machine by first engaging the projection 23 with the portion 7 of the cover plate at one side of the machine and then swinging the latch member 25 into engagement with the corresponding portion of the flange 7 at the opposite side of the machine. The downturned portion 11 of the base plate 10 contacts with the cover plate and limits downward movement of the check 7 relative to the machine as best seen in Fig. 2. When so positioned the lower or delivery end of the guide, consisting of the lower horizontal edge of the base plate 10, is immediately adjacent the drive or impression roller 3 so that checks placed in the guide member will be carried between said guide roller and the feed roller 4a. The desired signature or other indicia is therefore impressed on the check by the printing or type carrying roller 4 as heretofore described and as will be apparent from inspection of my aforesaid Patent No. 1,617,874. The impressed checks are delivered by gravity to a suitable trough or collection receptacle 29 located at the base of the machine on the delivery side of the printing and impression rollers 3 and 4.

From the foregoing it will be apparent that the adjustable check guide constituting the invention insures the location of printed impressions in a predetermined location uniformly on each individual check when a batch of checks are rapidly and successively fed to the machine to be marked uniformly in the same location. It is also apparent that the guide device is adjustable to effect location of the respective checks or papers with respect to the marking device of the machine so as to register the signature or other indicia in the respective locations desired or required on checks or papers of various sizes, or in different locations on checks of similar size when desired; and that such adjustment is readily and easily effected for each size of check, and for each different location on similar size checks. This adjustment is effected by a mere sliding movement of either or both of the members 12, 13, predetermined adjustment of the members 12 and 13 on the base plate 10 permitting various sizes of checks to be immediately accommodated and accurately positioning each check at a fixed point relative to the printing roller 4. The engagement of the ends of the check with the wings 14 and 15 of the adjustable slide members prevents the check from tilting or being canted laterally which would result in the signature being impressed at an angle to the space provided on the check for its reception. The provision of the side wings 14 and 15 further insures the printing of the signature uniformly on each check with respect to longitudinal dimension of the space provided for such signature. The members 12 and 13 may be readily positioned towards or away from one another by manipulation of the wing members to accommodate checks or other articles of various sizes and as determined by operation conditions. When it is desired to remove the check guide from the machine it is merely necessary to release the pivoted latch member 25 from engagement with the cover plate to permit the opposite end of the check guide as an entirety to be released from its engagement with the cover plate.

The invention is hereinabove set forth as embodied in a particular form of construction, but may be variously embodied within the scope of the claims hereinafter made.

What I claim is:

1. A check guide device for check endorsing machines comprising a metallic plate adapted to be removably secured to the cover of the machine, a pair of guide members having upstanding check-aligning flanges slidably mounted on said plate and adjustable towards and away from each other to accommodate checks of varying sizes and to position said checks in predetermined alignment with respect to the printing roller of the machine, and a pivoted latch member mounted on said plate and movable into engagement with said cover to removably secure the check guide device in position on the machine.

2. A check guide device for check endorsing machines comprising a plate removably secured to said machine, a guide channel in said plate, and a pair of guide members mounted on said plate and having guide flanges engaging said channel, one of said guide members being adjustable towards and away from the other on said plate to accommodate checks of various sizes and align the same in a predetermined manner relative to the machine.

3. A check guide device for check endorsing machines comprising a plate removably secured to the top of said machine, a guide channel in said plate, a pair of guide members slidably mounted on said plate and having marginal flanges engaging said channel, said guide members being adjustable towards and away from each other on said plate to accommodate and align checks of various sizes, and means for removably securing said check guide device to the check endorsing machine.

4. In a guide device for check endorsing machines the combination of a base plate adapted to be removably secured to the frame of the machine and having a guide channel, and a pair of movable check guiding members carried by the base plate and having portions extending into said guide channel, said check guiding members having upturned extensions for receiving a check therebetween, whereby each of said guiding members is adjustable on said base plate to receive checks of varying sizes and uniformly position the latter relative to the machine frame.

5. The combination with a check endorsing machine having a printer roller, of a check guide device comprising a guide carrying member adapted to be removably attached to said machine, a pair of check guiding wings carried by said guide carrying member and spaced from each other for guiding checks therebetween, said guide wings being so arranged on said guide carrying member for cooperation with the printing roller of the machine as to locate definitely a predetermined particular portion of each check in a predetermined position with respect to the printing roller of the machine by the guiding of the checks to the printing roller by said wings.

6. The combination with a check endorsing machine having a printer roller, of a check guide device comprising a guide carrying member secured to said machine, a pair of guide wings carried by said guide carrying member, said guide wings being adjustable towards and away from each other to accommodate checks of varying sizes and adapted to locate definitely any predetermined particular portion of each check in a predetermined position with respect to the printing roller of the machine by the guiding of the checks to the printing roller by said wings.

7. In a guide device for check endorsing machines the combination of a guide carrying member secured to the machine and having a guide channel, and a pair of movable check guiding wings carried by the guide carrying member and having channel portions extending into said guide channel, said guide wings extending upwardly from the guide carrying member for receiving a check therebetween whereby each of said guide wings is adjustable on said guide carrying member to receive checks of varying sizes and uniformly position the latter relative to the machine.

In testimony whereof I have hereunto set my hand.

HJALMAR SWANSON.